United States Patent
Solomon et al.

(10) Patent No.: US 10,118,249 B2
(45) Date of Patent: Nov. 6, 2018

(54) LASER BEAM WELDING WITH A SPIRAL WELD PATH HAVING A FIRST ORDER OF CONTINUITY

(71) Applicant: GM GLOBAL TECHNOLOGY OPERATIONS LLC, Detroit, MI (US)

(72) Inventors: Joshua L. Solomon, Southfield, MI (US); Hui-Ping Wang, Troy, MI (US); William P. Payne, Macomb, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 407 days.

(21) Appl. No.: 14/884,303

(22) Filed: Oct. 15, 2015

(65) Prior Publication Data

US 2017/0106470 A1   Apr. 20, 2017

(51) Int. Cl.
*B23K 26/04* (2014.01)
*B23K 26/22* (2006.01)

(52) U.S. Cl.
CPC .............. *B23K 26/04* (2013.01); *B23K 26/22* (2013.01)

(58) Field of Classification Search
CPC ................................ B23K 26/04; B23K 26/22
USPC ............. 219/121.63, 121.64, 121.78, 121.79
See application file for complete search history.

(56) References Cited

U.S. PATENT DOCUMENTS

| | | | | |
|---|---|---|---|---|
| 4,658,110 A | * | 4/1987 | Miller ................ | B23K 15/008 219/121.13 |
| 2010/0147809 A1 | * | 6/2010 | Geisler ................ | B60N 2/682 219/121.64 |
| 2013/0164583 A1 | * | 6/2013 | Humphrys ............ | B23K 20/10 429/94 |

FOREIGN PATENT DOCUMENTS

| | | | |
|---|---|---|---|
| CN | 102000920 A | 4/2011 | |
| CN | 102089114 A | 6/2011 | |
| CN | 102189335 A | 9/2011 | |
| CN | 102728960 A | 10/2012 | |
| CN | 103492117 A | 1/2014 | |
| CN | 104981317 A | 10/2015 | |
| CN | 105855706 A | 8/2016 | |
| JP | 60206568 A * | 10/1985 | ............... B23K 9/04 |
| WO | 2014155190 A2 | 10/2014 | |
| WO | 2015129231 A1 | 9/2015 | |
| WO | 2015139840 A1 | 9/2015 | |

* cited by examiner

*Primary Examiner* — Samuel M Heinrich
(74) *Attorney, Agent, or Firm* — Quinn IP Law (57) ABSTRACT

A method of laser welding a first component to a second component includes moving at least one of a laser beam and the components via a controller along a weld path at least a portion of which is a spiral having a first order of continuity thereby welding the first component to the second component. In one embodiment, the spiral is an Archimedean spiral.

16 Claims, 8 Drawing Sheets

LASER BEAM WELDING WITH A SPIRAL WELD PATH HAVING A FIRST ORDER OF CONTINUITY

TECHNICAL FIELD

The present teachings generally include methods of laser welding.

BACKGROUND

Factors considered for laser beam welding of components include outgassing, heat input, beam velocity, weld penetration, and weld surface smoothing, each of which can affect the resulting weld strength and visual presentation.

SUMMARY

A method of laser beam welding includes controlling movement of the laser beam along a weld path, and may include controlling other operating parameters, such as beam power, defocusing, and velocity, to provide desired heat distribution with sufficient weld penetration to generate a sufficiently strong weld with a smooth weld surface. The method maintains a stable keyhole and a constant outgassing of gas pores in a weld pool during the welding.

A method of laser welding a first component to a second component includes moving at least one of a laser beam and the components via a controller along a weld path at least a portion of which is a spiral having a first order of continuity thereby welding the first component to the second component. The movement is via a controller. In one embodiment, the spiral is an Archimedean spiral. Movement may be from an inner end of the spiral to an outer end of the spiral, especially for welding of bare steel (i.e., uncoated steel) or zinc-coated steel components. Optionally, the weld path may include a closed curve, such as a circle, continuing from the outer end of the spiral. Movement may instead be from the outer end of the spiral to the inner end of the spiral, especially for welding of aluminum alloys. The movement may include oscillating the beam along the weld path. The method may include controlling at least one of a defocusing distance of the laser beam, a velocity of the laser beam, or a power level of the laser beam during the moving to continuously increase, to continuously decrease, or to remain constant.

The above features and advantages and other features and advantages of the present teachings are readily apparent from the following detailed description of the best modes for carrying out the present teachings when taken in connection with the accompanying drawings.

DETAILED DESCRIPTION

Figure 1:
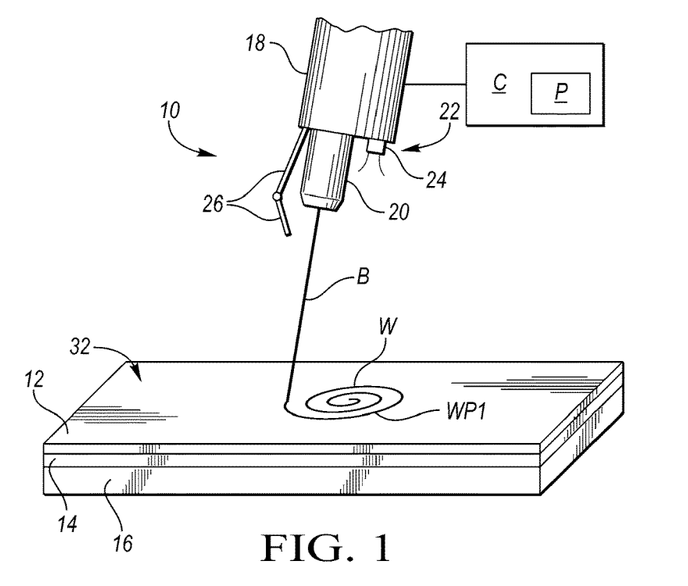
FIG. 1 is a schematic illustration of a laser welding assembly in fragmentary side view showing a laser beam following a weld path to weld three components to one another.

Referring to the drawings, wherein like reference numbers refer to like components throughout the views, FIG. 1 shows a portion of a system 10 for remote laser welding of a first component 12, a second component 14, and a third component 16. In the embodiment shown, the components 12, 14, 16 are three stacked zinc-coated sheets. Optionally, the components 12, 14, 16 could be bare steel (i.e., uncoated steel). It should be appreciated, that the system 10 and the welding methods described herein can be used for other types of components. For example, the components may be other materials, there may be only two or more than three components, or the components may be abutted or adjacent one another but not stacked.

In FIG. 1, the components 12, 14, 16 may be stacked on a base (not shown) in a predetermined position and held thereto by a fixture (not shown) as is understood by those skilled in the art. The system 10 includes a robotic arm 18 on which is mounted a laser weld gun 20 operable to provide a laser beam B for remote laser welding of the components 12, 14, 16. The robotic arm 18 and the weld gun 20 are operatively connected to and controllable by an electronic controller C that has a processor P and tangible, non-transitory memory on which is recorded instructions executable by the processor P to control movement of the robotic arm 18 and operation of the weld gun 20. For example, the controller C controls power and focus of the laser beam B, and the velocity of the weld gun 20. The beam B may be continuous or pulsed, and may be oscillated as described herein. Alternatively or in addition, the controller C may control movement of a base or fixture on which the components 12, 14, 16 (or components 112, 114 in FIG. 12) are positioned such that the components move relative to the laser beam B to create any of the weld paths described herein.

Optionally, the controller C determines the location of the components 12, 14, 16 using any suitable locating system, such as a vision system 22 having at least one camera 24. Any one or more of various arrangements of vision systems 22 may be used for providing visual information to the controller C. Optionally, a movable mirror system 26 can be included in the weld gun 20 and may be controlled by the controller C to deflect the laser beam B as desired. In such an embodiment, the controller C thus remotely steers the laser beam B via the mirror system 26.

Figure 2:
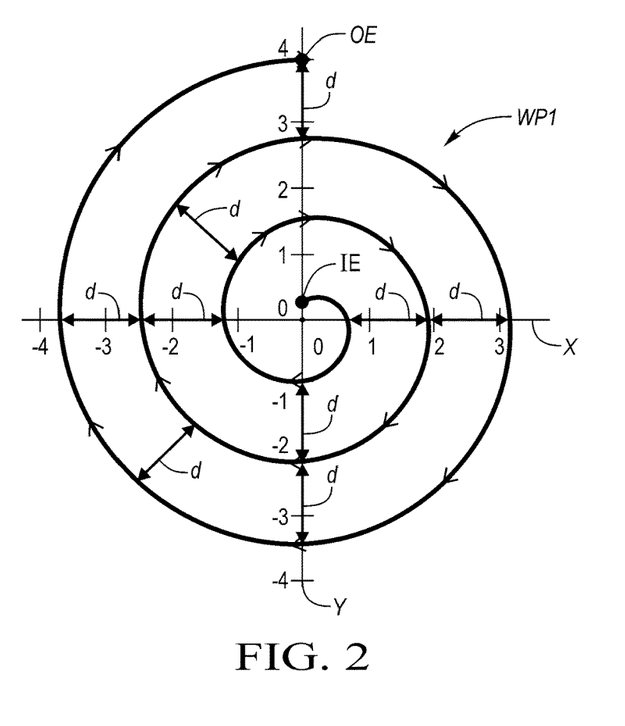
FIG. 2 is a schematic illustration of a first spiral weld path within the scope of the present teachings.

FIG. 1 shows the laser beam B controlled to create a weld W along a first weld path WP1. The weld path WP1 is shown in greater detail in FIG. 2. More specifically, the weld path WP1 has a first order of parametric continuity C1, i.e., the parametric first derivatives are equal at the intersection of any two successive sections of the weld path WP1. In particular, the weld path WP1 is an Archimedean spiral, which is defined as the locus of points corresponding to the locations over time of a point moving away from a fixed point with a constant speed along a line which rotates with constant angular velocity. A point rotating along an Archimedean path has its angular velocity ω proportional to its line velocity v. Equivalently, in polar coordinates (r, θ), an Archimedean spiral can be described by the equation:

$r = a + b\theta$; where $a$ is selected as a parameter that turns the spiral and b controls the distance between successive turnings. For a given b, the distance d between turning curves is constant. An example distance d is shown in FIG. 2. Because the distance d is constant, one advantage to a weld path that is an Archimedean spiral is that heat conduction through the welded material is equally spaced.

In Cartesian coordinates, the equation of the Archimedean spiral is:

$$x = (a + b\theta) \times \cos(\theta); \text{ and}$$

$$y = (a + b\theta) \times \sin(\theta).$$

Figure 5:
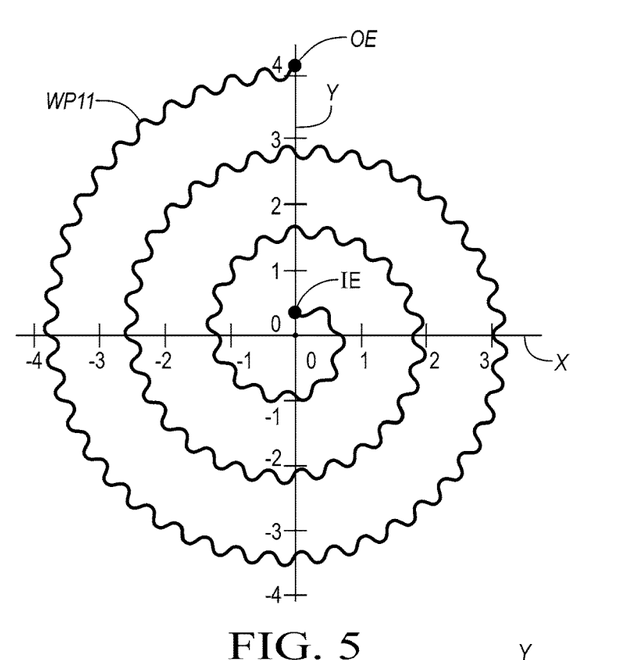
FIG. 5 is a schematic illustration of oscillation of the laser beam along the weld path of FIG. 2 within the scope of the present teachings.

In FIG. 2, coordinates shown on the X-axis and the Y-axis are considered to be in millimeters for purposes of illustration, but could be any units of distance. The direction of moving the laser beam B along the weld path WP1 in FIG. 2 is from an inner end IE of the spiral portion of the weld path WP1 to an outer end OE of the spiral portion of the weld path WP1, as indicated by the arrowheads along the weld path WP1. Welding along the weld path WP1 is shown as proceeding in a clockwise direction, but welding could also proceed along an Archimedean spiral from an inner end to an outer end in a counterclockwise direction. In FIG. 2, the spiral portion of the weld path WP1 is the entire weld path WP1. Optionally, the laser beam B can be controlled to oscillate along the weld path WP1 as indicated in FIG. 5 to establish an oscillated weld path WP11. Oscillating the laser beam B provides increased heat diffusion.

Figure 3:
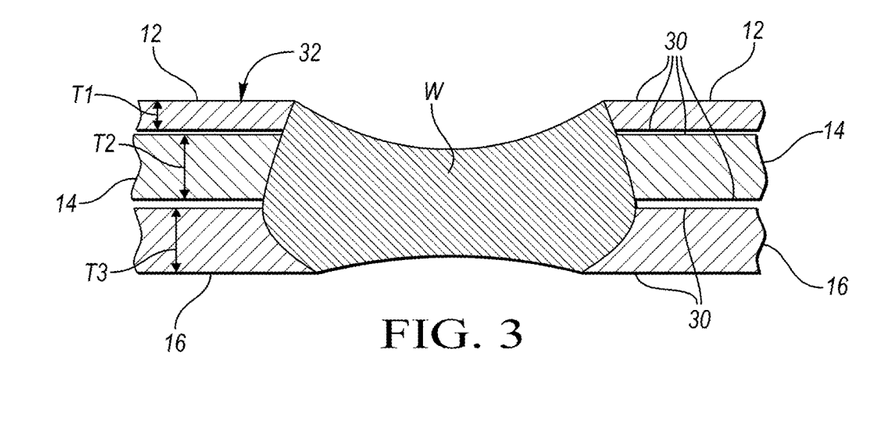
FIG. 3 is a schematic cross-sectional illustration of a weld of the components of FIG. 1.

An Archimedean weld path guarantees equal density of laser heat coverage between turns of the spiral due to an equal distance in the radial direction between turns, as described herein. Additionally, a single curve is programmed for the spiral. In comparison, a known laser path that consists of concentric circles is not a continuous path, and so may have more difficult control of the laser gun movement. A known laser path that consists of nonconcentric half circles to create a spiral has a subjective and non-equal distance between curves due to the different center point of each half circle. As shown in FIG. 3, the third component 16 is positioned adjacent the first and the second components 12, 14 so that the second component 14 is between the first component 12 and the third component 16. The first, second, and third components 12, 14, 16 may each have the same thickness or one or more may have different thicknesses. In the embodiment shown, the first component 12 has a thickness T1 less than a thickness T2 of the second component and also less than a thickness T3 of the third component. In the embodiment shown, the first, second, and third components 12, 14, 16 are zinc-coated steels, but other materials may be used within the scope of the present teachings. The zinc coating 30 on outer surfaces of each of the components 12, 14, 16 is indicated in FIG. 3. As indicated in FIG. 3, the weld W secures the components 12, 14, 16 to one another and penetrates all of the components 12, 14, 16. The laser beam B creates the weld W along the outer surface 32 of the first component 12. FIG. 3 is a cross-sectional view of the weld W taken perpendicular to the direction of movement at any point along the weld path WP1.

Figure 6:
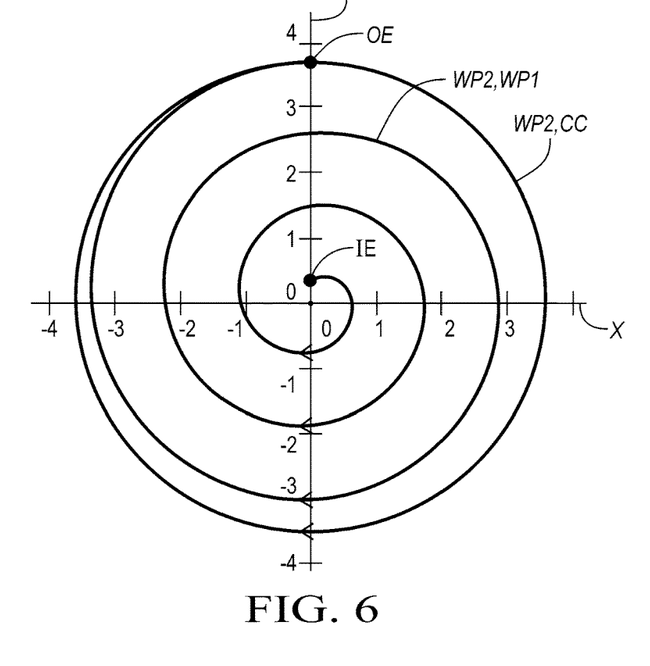
FIG. 6 is a schematic illustration of a second spiral weld path within the scope of the present teachings.

FIG. 6 shows an alternative weld path WP2 that may be used within the scope of the present teachings. The weld path WP2 includes the WP1 with the Archimedean spiral, and further includes a closed curve CC that surrounds the spiral and is continuous from the outer end OE of the spiral. The closed curve is a circle. In other words, the WP2 includes a circle with a radius that is the distance from the origin of the Cartesian coordinates of the Archimedean spiral to the outer end OE. The weld gun 20 is controlled by the controller C to weld along the path WP2 beginning at the inner end IE of the spiral and proceeding clockwise to the outer end OE of the spiral, and after the spiral, moving in clockwise circle about the origin, from the outer end OE to the outer end OE. Alternatively, a weld path with an Archimedean spiral and a closed circle could proceed from the inner end to the outer end as described, but with the spiral and the closed circle both welded in a counter-clockwise direction.

Figure 4:
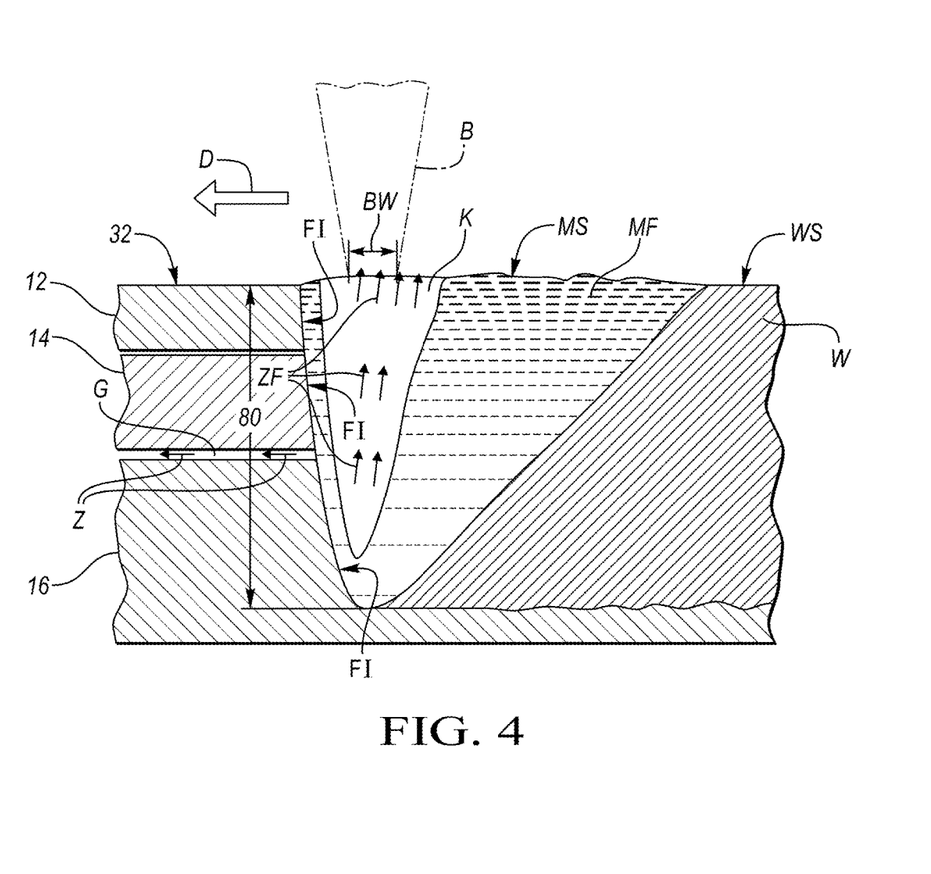
FIG. 4 is a schematic cross-sectional illustration of the weld of the components of FIG. 1 showing a keyhole and a weld pool as the beam moves along the weld path.

FIG. 4 is a cross-sectional view of the weld W taken along the direction D of movement of the laser beam B at any point along the weld path WP1, WP11 or WP2. In other words, the direction D is the direction of the laser beam B as it moves via the robotic arm 18 and weld gun 20 from one point on the weld path WP1, WP11, or WP2 to the next point on the weld path WP1, WP11, or WP2. The controller C controls movement of the robotic arm 18 and controls parameters of the weld gun 20 and thus the weld beam B to establish a substantially pore-free, sufficiently strong, and aesthetically pleasing weld W. For example, the power supplied to the weld gun 20, the defocusing distance of the laser beam B, and the velocity of movement of the laser beam B (i.e., of the robotic arm 18) along the weld path WP1, WP11, or WP2 are controlled. In various embodiments, one or more of the power supplied to the weld gun 20, the defocusing distance of the laser beam B, or the velocity of movement of the laser beam B can be continuously increased, continuously decreased, or held at a constant level over one or more portions of the weld paths WP1, WP11, or WP2. Due to these parameters, deep weld penetration 80 is provided, a keyhole K remains continuously open, and zinc outgassing can occur via the continuously open keyhole K (as indicated by arrows ZF) or through gaps G between the components 12, 14, 16 (as indicated by arrows Z). The keyhole K is continuously open when the keyhole K is open at the surface MS of the molten flow MF. As used herein, a "stable" keyhole is a continuously open keyhole. Deep weld penetration 80 ensures adequate fusion area at the faying interfaces FI of the components 12, 14, 16. Because the keyhole K remains continuously open and avoids total collapsing, outgassing is enhanced. Additionally, the controlled welding parameters ensure non-turbulent molten flow MF before solidification of the weld W for achieving a predetermined low surface roughness of the weld surface WS.

Figure 7:
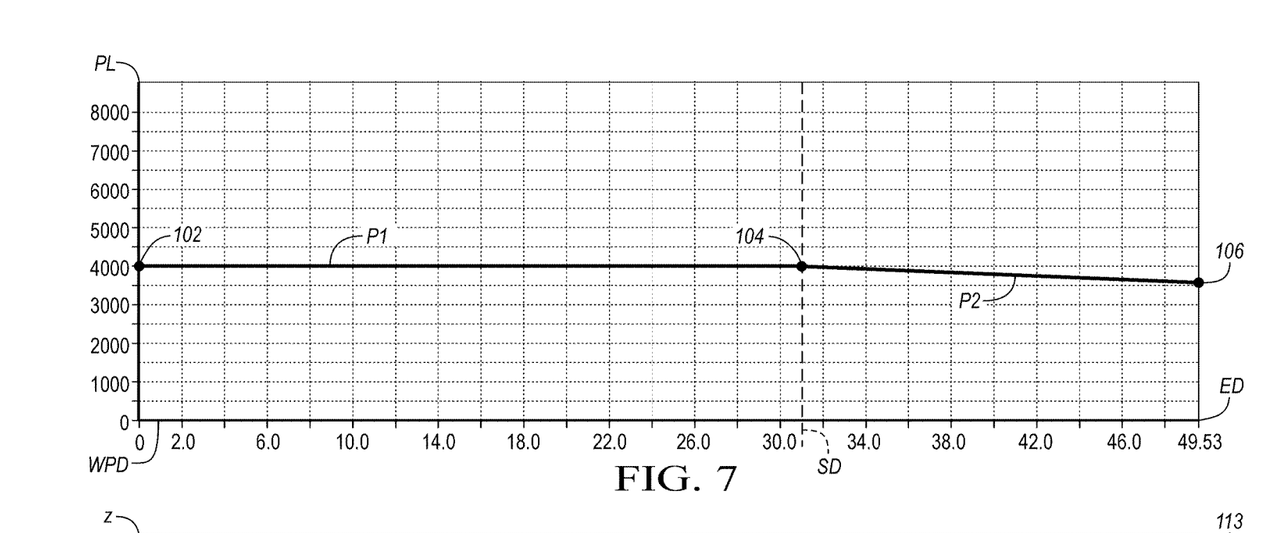
FIG. 7 is a plot of laser beam power (in watts) on the vertical axis versus distance (in millimeters) along the weld path of FIG. 6.
Figure 8:
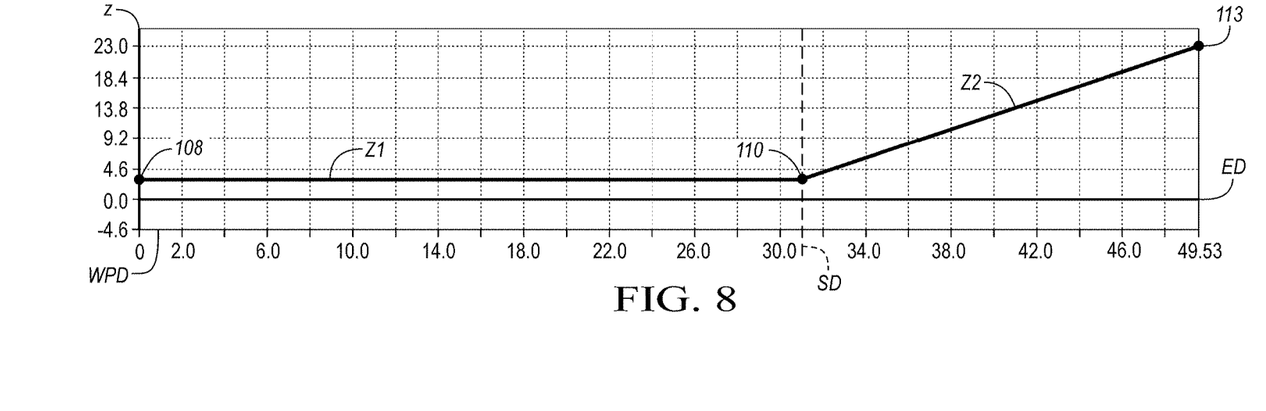
FIG. 8 is a plot of laser beam defocusing distance (in millimeters) on the vertical axis versus distance (in millimeters) along the weld path of FIG. 6.
Figure 9:
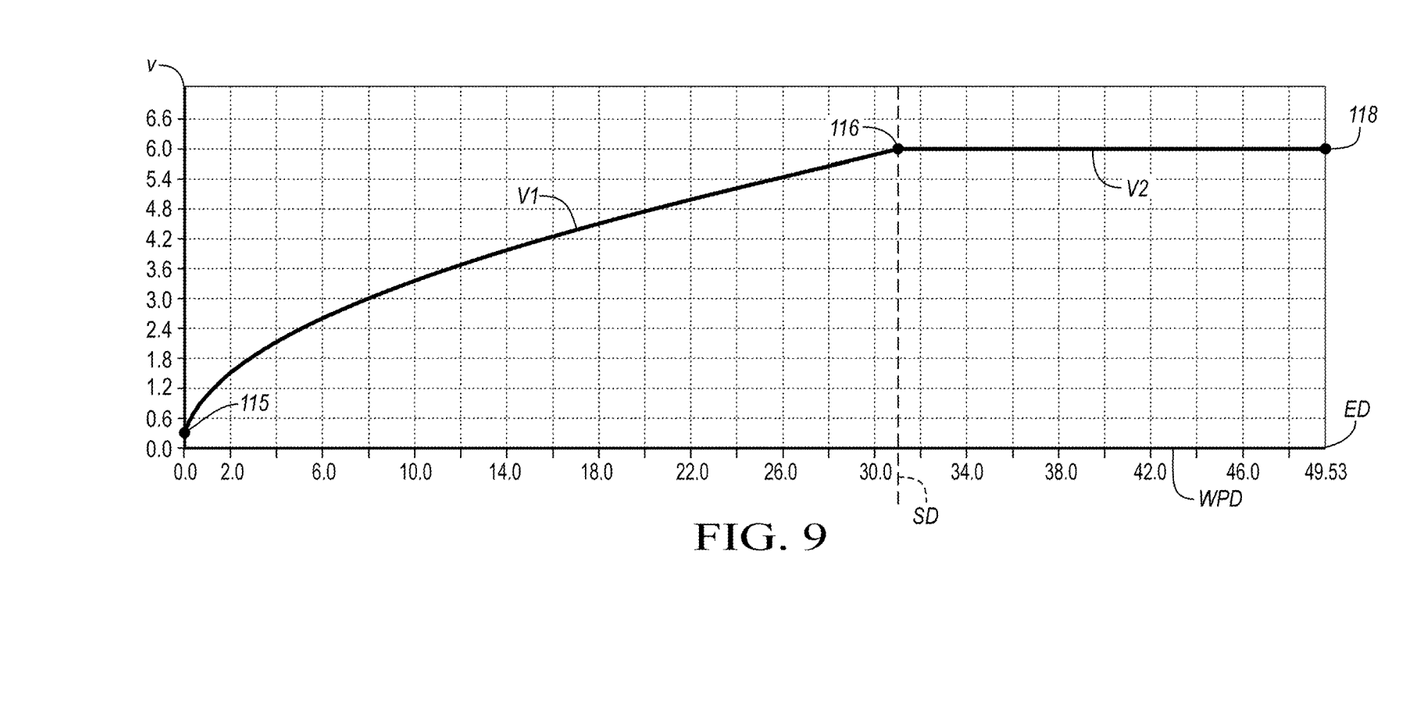
FIG. 9 is a plot of laser beam velocity (in meters per minute) on the vertical axis versus distance (in millimeters) along the weld path of FIG. 6.

FIGS. 7-9 illustrate the controlled welding parameters that achieve the weld path WP2. In each of FIGS. 7-9, the X-axis is the distance WPD along the weld path WP2 of FIG. 6 in millimeters. FIGS. 7-9 illustrate that welding parameters are controlled in two different stages, with the first stage being during welding of the spiral portion of the weld path WP2, from the inner end IE (at 0 mm, the start of the weld path WP2) to the outer end OE (shown for purposes of example only at 31 mm in length along the weld path WP2) indicated as the spiral distance SD. The second stage is during welding along the closed curve CC, which is from the spiral distance SD to the end distance ED at the completion of the weld. The length from the spiral distance SD to the end distance ED is the distance along the closed curve CC which, in the embodiment shown, is the perimeter of a circle.

More specifically, FIG. 7 shows power PL in watts of the laser beam B on the Y-axis and length of travel WPD along the weld path WP2 in millimeters (mm) on the X-axis. Power PL of the laser beam B is held at a first predetermined power level P1 during movement of the laser beam B along the spiral from the inner end IE at 0 mm, shown as point 102, to the outer end OE at 31 mm, shown as point 104. Power PL of the laser beam B is then controlled to a continuously linearly decreasing power level P2 from power level P1 at point 104 to a final power level 106 as the laser beam B is controlled to move along the closed circle CC in FIG. 6. For purposes of example only, the first predetermined power level P1 is 4000 watts and the final power level 106 is 3500 watts.

FIG. 8 is a plot of laser beam defocusing distance z (in millimeters) on the vertical axis versus distance WPD along the weld path WP2 of FIG. 6 in millimeters. As is understood by those of ordinary skill in the art, where a defocusing lens is used, z is the distance from the virtual focus to the lens, and increasing z increases the width BW of the beam B on the weld path WP2, thereby decreasing the intensity of the beam B. FIG. 8 illustrates that a first predetermined defocusing distance Z1 of the laser beam B is maintained during the first stage of welding from WPD at 0 mm shown as point 108 to the outer end OE at 31 mm, shown as point 110 WPD at SD (i.e., during the moving of the laser beam B along the spiral), and that a continuously increasing defocusing distance Z2 of the laser beam B is provided along the closed curve CC (i.e., during the second stage of welding from SD to ED. The continuously increasing defocusing distance Z2 in the second stage increases from the first predetermined defocusing distance Z1 to a final defocusing distance 113.

FIG. 9 is a plot of velocity v (in meters per minute) of the laser beam B on the vertical axis versus WPD along the weld path WP2 of FIG. 6 in millimeters. FIG. 9 illustrates that a continuously nonlinearly increasing velocity V1 of the laser beam B is maintained during the first stage of welding from WPD at 0 mm shown as point 115 to the outer end OE at 31 mm, shown as point 116 at SD (i.e., during the moving of the laser beam B along the spiral), and that a predetermined constant velocity V2 of the laser beam B is provided along the closed curve CC (i.e., during the second stage of welding from SD to ED) as indicated by the constant velocity of 6.0 meters per minute from point 116 to point 118.

The predetermined welding parameters shown in FIGS. 7-9 provide the deep weld penetration 80 of FIG. 4 so that the molten flow MF interfaces with each of the components 12, 14, 16 and zinc outgassing Z occurs in the gaps G. Non-turbulent molten flow MF and an open keyhole K for zinc outgassing ZF are also provided. More specifically, the laser heat input (power PL) is kept continuous at a continuous defocusing distance Z1 during welding along the spiral for a stable open keyhole K and continuous zinc outgassing ZF. The laser beam velocity V1 continuously increases in a non-linear manner during the first stage so that the cumulative effect on the outer curves of heat conduction from welding along the inner curves of the spiral is balanced by the increasing velocity of the weld beam B to maintain constant heat input, maintaining deep penetration but avoiding complete burn through of the weld W (i.e., preventing the weld W from reaching the bottom of the third component 16 in FIG. 4). During the outer closed curve portion of the weld path WP2, the heat input is reduced by reducing power level P2 and increasing the focus distance Z2 from surface smoothing via shallow penetration and reduced undercut (e.g., depth near the outer edges of the weld W relative to the outer surface 32 of the first component 12). For example, the reduced undercut is beneficial for welding of three components with a relatively thin component (e.g., first component 12) having the weld surface. The velocity of the laser beam B is kept constant at velocity V2 for even conduction mode. The example velocities provided in FIG. 9 enable efficiency as a weld, such as weld W, can be completed in approximately 0.6 seconds, whereas a conventional resistance spot welding of a weld requires approximately 0.8 seconds in addition to the time required to move the weld gun 20 between spot welds.

In summary, the resulting weld W will avoid zinc-induced porosity, will reduce spatter (due to the outgassing), and will have a smooth weld surface (due to the beam defocusing and power level control)

Additionally, a weld path with first order continuity and no discontinuities, such as weld paths WP1, WP11, or WP2, is relatively easy to program into the memory of the controller C and carry out by the processor P. An Archimedean path also ensures a constant density of laser heat coverage, and as a high order of smoothness enabling a stable fusion process.

Figure 10:
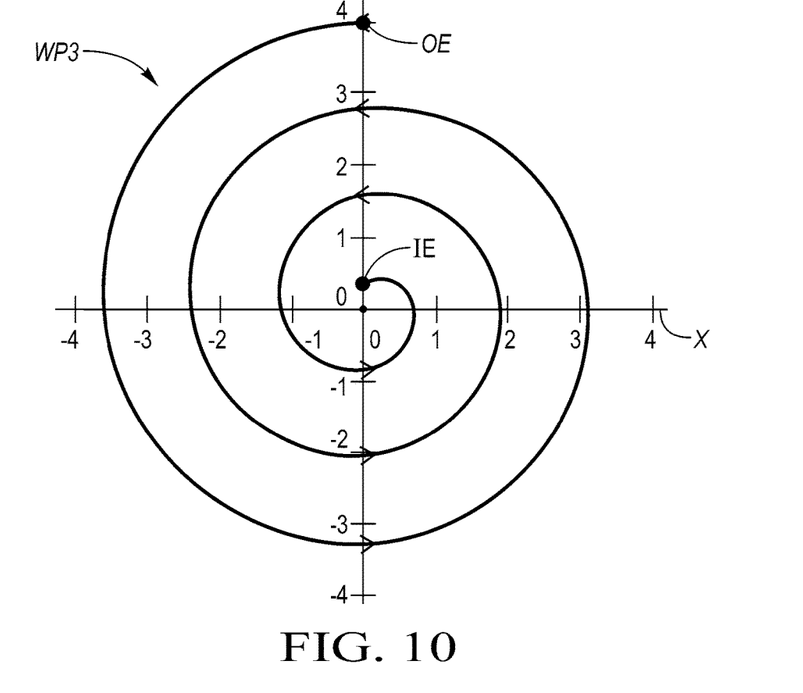
FIG. 10 is a schematic illustration of a third spiral weld path within the scope of the present teachings.
Figure 11:
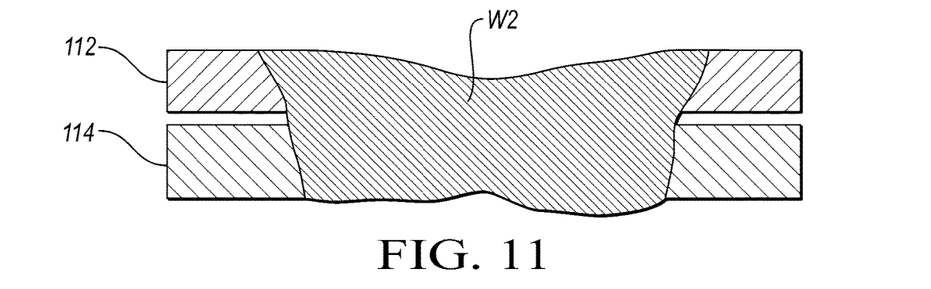
FIG. 11 is a schematic cross-sectional illustration of a weld of two components using the weld path of FIG. 10.

FIG. 10 illustrates an alternative weld path WP3 with first order continuity within the scope of the present teachings. Weld path WP3 is an Archimedean spiral with direction of movement of the laser beam B along the weld path WP3 starting at the outer end OE and ending at the inner end IE. As shown in FIG. 10, the direction of movement of the laser beam B is counterclockwise. However, within the scope of the present teachings, movement could be clockwise along an Archimedean spiral from the outer end OE to the inner end IE. Additionally, the laser beam B could be oscillated along the weld path WP3 similar to FIG. 5. The weld path WP3 may be applied to a variety of components. For purposes of illustration, the weld path WP3 is applied to create a weld W2 of stacked first and second components 112, 114 in FIG. 11, which may be sheets of an aluminum alloy.

Figure 12:
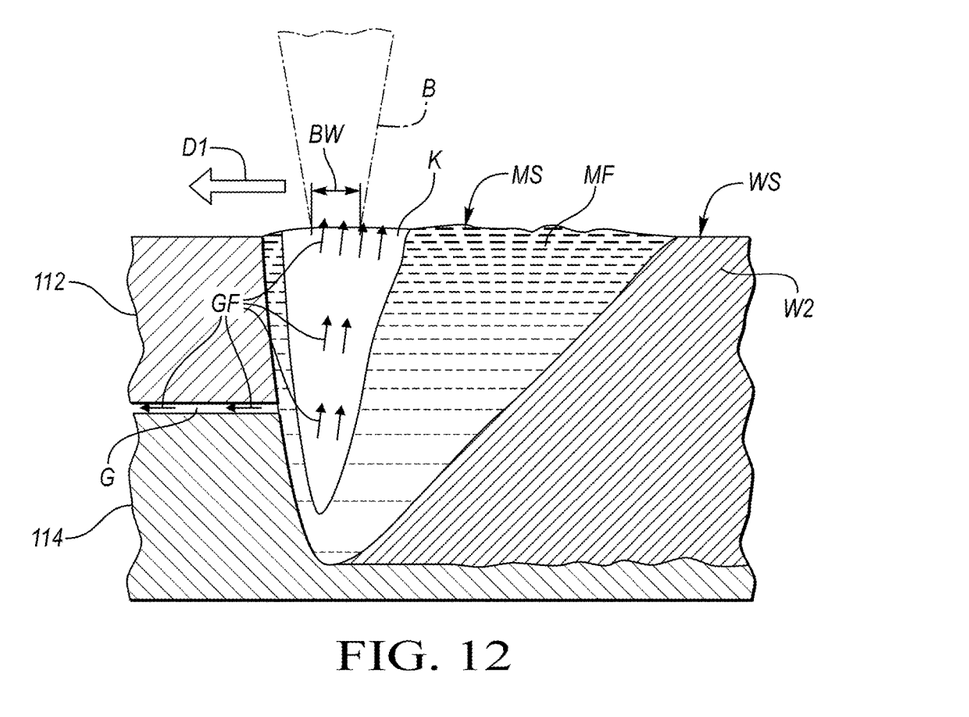
FIG. 12 is a schematic cross-sectional illustration of the weld of the two components of FIG. 11 according to the weld path of FIG. 10 showing a keyhole and a weld pool as the beam moves along the weld path.

FIG. 12 is a cross-sectional view of the weld W2 taken along the direction D1 of movement of the laser beam B at any point along the weld path WP3. In other words, the direction D1 is the direction of the laser beam B as it moves via the robotic arm 18 and weld gun 20 from one point on the weld path WP3 to the next point on the weld path WP3. The controller C controls movement of the robotic arm 18 and controls parameters of the weld gun 20 and thus the weld beam B to establish a substantially pore-free, sufficiently strong (i.e., substantially crack-free), and aesthetically pleasing weld W2. For example, the power supplied to the weld gun 20, the focus of the laser beam B, and the velocity of movement of the laser beam B (i.e., of the robotic arm 18) along the weld path WP3 are controlled. Due to these parameters, deep weld penetration 80 is provided, a keyhole K remains continuously open, and hydrogen gas and magnesium vapor outgassing can occur via the continuously open keyhole K or through a gap G between the components 112, 114. The outgassing is indicated by arrows GF. Additionally, the controlled welding parameters ensure non-turbulent molten flow MF before solidification of the weld W2 for achieving a predetermined low surface roughness of the weld surface WS.

Figure 13:
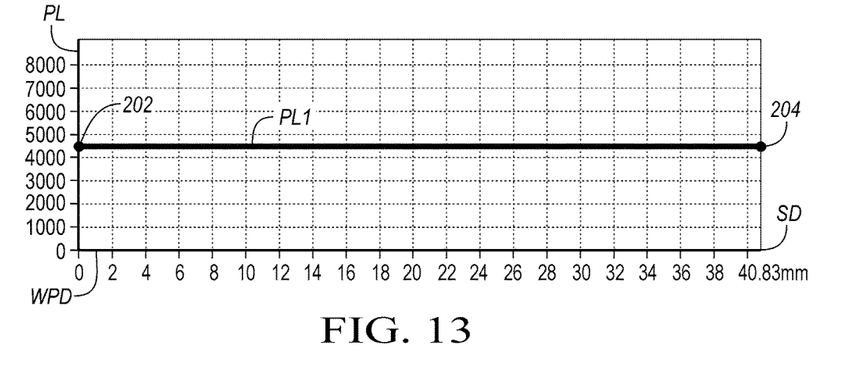
FIG. 13 is a plot of laser beam power (in watts) on the vertical axis versus distance (in millimeters) along the weld path of FIG. 10.
Figure 14:
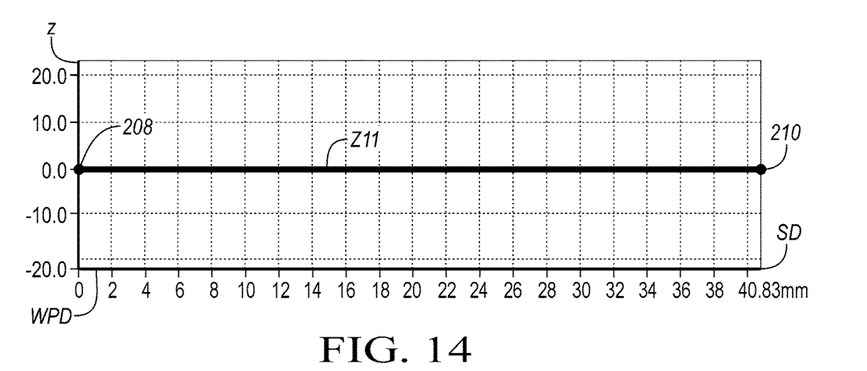
FIG. 14 is a plot of laser beam defocusing distance (in millimeters) on the vertical axis versus distance (in millimeters) along the weld path of FIG. 10.
Figure 15:
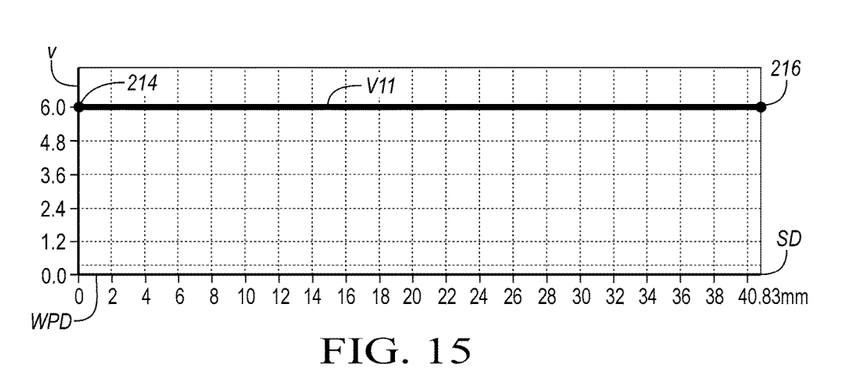
FIG. 15 is a plot of laser beam velocity (in meters per minute) on the vertical axis versus distance (in millimeters) along the weld path of FIG. 10.

FIGS. 13-15 illustrate the controlled welding parameters that achieve the weld path WP3. In each of FIGS. 13-15, the X-axis is the distance WPD along the weld path WP3 of FIG. 10 in millimeters. The weld path WP3 begins at the outer end OE at 0 mm, and proceeds along the Archimedean spiral (or oscillating along the Archimedean spiral) to the inner end IE (shown for purposes of example only at 40.83 mm in length along the weld path WP3) indicated as the spiral distance SD.

More specifically, FIG. 13 shows power PL in watts of the laser beam B on the Y-axis and length of travel WPD along the weld path WP3 in millimeters (mm) on the X-axis. Power of the laser beam B is held at a first predetermined power level PL1 during movement of the laser beam B along the spiral from the outer end OE at 0 mm, shown as point 202, to the inner end IE at 40.83 mm, shown as point 204. For purposes of example only, the first predetermined power level PL1 is 4500 watts.

FIG. 14 is a plot of laser beam defocusing distance z (in millimeters) on the vertical axis versus distance WPD along the weld path WP3 of FIG. 6 in millimeters. FIG. 14 illustrates that a first predetermined defocusing distance Z11 of 0 mm of the laser beam B is maintained during the welding from the outer end OE at 0 mm shown as point 208 to the inner end IE at 40.83 mm, shown as point 210 WPD at SD (i.e., during the moving of the laser beam B along the spiral).

FIG. 15 is a plot of velocity v (in meters per minute) of the laser beam B on the vertical axis versus WPD along the weld path WP3 of FIG. 10 in millimeters. FIG. 15 illustrates that a continuous velocity V11 of the laser beam B is maintained during the welding from WPD from the outer end OE at 0 mm shown as point 214 to the inner end IE shown as point 216 WPD at SD (i.e., during the moving of the laser beam B along the spiral.

The constant laser heat input (e.g., constant power level PL1 and constant z defocusing level Z11 with a constant velocity V11) are appropriate for a stable keyhole K and outgassing in the aluminum alloy material which has greater conduction than zinc-coated steels. The reverse scanning path drives gas pores and zinc vapor away from the welds W2 peripheral load bearing zone and into the weld center, and drives gas pores and zinc vapor out of the molten flow MF.

While the best modes for carrying out the many aspects of the present teachings have been described in detail, those familiar with the art to which these teachings relate will recognize various alternative aspects for practicing the present teachings that are within the scope of the appended claims.

The invention claimed is:

1. A method of laser welding a first component to a second component comprising:
moving at least one of a laser beam and the components via a controller along a weld path, at least a portion of which is a spiral having a first order of continuity, thereby welding the first component to the second component; wherein the moving is via a controller;
wherein a direction of the moving is from an inner end of the spiral to an outer end of the spiral;
wherein the weld path further comprises a closed curve that surrounds the spiral and is continuous from the outer end of the spiral; and
wherein the moving is along the closed curve after the spiral.

2. The method of claim 1, wherein the closed curve is a circle.

3. The method of claim 1, wherein the method includes:
maintaining a first predetermined defocusing distance of the laser beam during the moving along the spiral; and
continuously increasing the defocusing distance of the laser beam along the closed curve; wherein the continuously increasing defocusing distance increases from the first predetermined defocusing distance.

4. The method of claim 1, further comprising:
continuously increasing a velocity of the moving from the inner end of the spiral to the outer end of the spiral; and
maintaining a predetermined constant velocity of the moving along the closed curve; wherein the predetermined constant velocity is the velocity at the outer end of the spiral.

5. The method of claim 1, further comprising:
maintaining a first predetermined constant power level of the laser beam during the moving along the spiral; and
continuously decreasing the power level of the laser beam during the moving along the closed curve; wherein the continuously decreasing power level decreases from the first predetermined constant power level.

6. The method of claim 1, further comprising:
positioning a third component adjacent the first and the second components so that the second component is between the first and the third components; and
wherein the laser beam welds the first, second, and third components to one another and the weld path is on an exposed surface of the first component.

7. The method of claim 6, wherein the first, second, and third components are uncoated steel or zinc-coated steel.

8. The method of claim 1, wherein the moving includes oscillating the laser beam.

9. The method of claim 1, further comprising:
maintaining at least one of a predetermined constant power level of the laser beam, a predetermined constant focus distance of the laser beam, and a predetermined constant velocity of the laser beam during the moving.

10. The method of claim 1, wherein the first component and the second component are aluminum alloys.

11. The method of claim 1, further comprising:
controlling at least one of a defocusing distance of the laser beam, a velocity of the moving of the laser beam, or a power level of the laser beam during the moving to continuously increase, to continuously decrease, or to remain constant.

12. The method of claim 1, wherein the spiral is an Archimedean spiral.

13. A method of laser welding a first component to a second component, wherein the first and second components are aluminum alloys, and the method comprising:

moving a laser beam via a controller along a weld path on an outer surface of the first component; wherein at least a portion of the weld path is an Archimedean spiral;

wherein a direction of the moving of the laser beam is from an outer end of the spiral to an inner end of the spiral; and maintaining a predetermined constant power level of the laser beam, a predetermined constant focus distance of the laser beam, and a predetermined constant velocity of the laser beam during the moving of the laser beam along the spiral, thereby welding the first component to the second component with the predetermined constant power level, the predetermined constant focus distance, and the predetermined constant velocity being selected to maintain a stable keyhole and a constant outgassing of gas pores in a weld pool during the welding.

14. The method of claim 13, further comprising:

oscillating the laser beam during the moving the laser beam along the weld path.

15. A method of laser welding a first component, a second component, and a third component to one another, wherein the first, the second, and the third components are steel, and the method comprising:

moving a laser beam via a controller along a weld path on an outer surface of the first component; wherein at least a portion of the weld path is an Archimedean spiral and at least a portion of the weld path is a closed curve that surrounds the spiral and is continuous from an outer end of the spiral;

wherein a direction of the moving of the laser beam is from an inner end of the spiral to the outer end of the spiral and then along the closed curve;

maintaining a first predetermined constant power level of the laser beam during the moving of the laser beam from the inner end of the spiral to the outer end of the spiral;

continuously increasing a velocity of the moving of the laser beam as the laser beam moves from the inner end of the spiral to the outer end of the spiral;

continuously decreasing a power level of the laser beam along the closed curve; wherein the continuously decreasing power level decreases from the first predetermined constant power level; and maintaining a predetermined constant velocity of the moving of the laser beam as the laser beam moves along the closed curve; wherein the predetermined constant velocity is the velocity of the laser beam at the outer end of the spiral;

thereby welding the first component to the second component with the first predetermined constant power level, the continuously decreasing power level, and the predetermined constant velocity being selected to maintain a stable keyhole and a constant outgassing of gas pores in a weld pool during the welding.

16. The method of claim 15, further comprising:

oscillating the laser beam during the moving the laser beam along the weld path.

* * * * *